United States Patent [19]

Hileman et al.

[11] Patent Number: 5,963,424
[45] Date of Patent: *Oct. 5, 1999

[54] PULSAR DESK TOP SYSTEM THAT WILL PRODUCE 500 WATTS OF HEAT

[75] Inventors: Vince Hileman, San Jose; Steven J. Furuta, Santa Clara; Kenneth Kitlas, San Jose; Kenneth Gross, Los Altos; Quyen Vu, Fremont; Lee Winick; Nagaraj P. Mitty, both of San Jose; Clifford B. Willis, Tracy, all of Calif.

[73] Assignee: Sun Microsystems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/551,773
[22] Filed: Nov. 7, 1995
[51] Int. Cl.⁶ .................................................... H05K 7/20
[52] U.S. Cl. .......................................... 361/695; 361/687
[58] Field of Search ...................... 312/223.2; 364/708.1; 165/58, 80.3, 122–126; 361/683–687, 690, 694, 695, 796, 784, 788; 454/184

[56] References Cited

U.S. PATENT DOCUMENTS

| | | | |
|---|---|---|---|
| 4,149,218 | 4/1979 | Carrubba | 361/383 |
| 4,417,295 | 11/1983 | Stuckert | 361/384 |
| 4,672,509 | 6/1987 | Speraw | 361/384 |
| 4,765,397 | 8/1988 | Chrysler | 361/699 |
| 5,103,374 | 4/1992 | Azar | 361/382 |
| 5,121,291 | 6/1992 | Cope | 361/384 |
| 5,210,680 | 5/1993 | Scheilder | 361/384 |
| 5,484,012 | 1/1996 | Hiratsuka | 165/40 |
| 5,491,610 | 2/1996 | Mok | 361/695 |
| 5,508,883 | 4/1996 | Lumbra | 361/697 |
| 5,526,289 | 6/1996 | Dinh | 364/557 |
| 5,528,454 | 6/1996 | Niklos | 361/695 |
| 5,630,469 | 5/1997 | Butterbaugh | 165/80.3 |
| 5,734,551 | 3/1998 | Hileman | 361/695 |

*Primary Examiner*—Gerald Tolin
*Attorney, Agent, or Firm*—Blakely Sokoloff Taylor & Zafman

[57] ABSTRACT

A computer housing which includes a chassis that has a first compartment and a second compartment. The first compartment includes a first electronic assembly and a first fan that creates a flow of air through the compartment to create a compartment pressure that is less than an ambient pressure. The second compartment contains a second electronic assembly and a second fan which produces a flow of air that creates pressure within the compartment that is greater than the ambient pressure. The housing also contains an inner wall which separates the first compartment from the second compartment to inhibit air flow between the compartments.

9 Claims, 2 Drawing Sheets

5,963,424

PULSAR DESK TOP SYSTEM THAT WILL PRODUCE 500 WATTS OF HEAT

BACKGROUND OF THE INVENTION

1. Field of the Invention

The present invention relates to a computer chassis assembly.

2. Description of Related Art

Computers housings typically contain a chassis that supports an outer cover or shell. Within the chassis are a plurality of electronic cards that are plugged into a motherboard. The computer also contains a power supply and massive storage devices such as a hard disk drive, floppy disk drive, etc. The electronic devices within the computer generate heat during the operation of the system. The heat must be removed to maintain the temperature of the devices below a maximum threshold operating temperature. Prior art computers typically contain one or more fans that create a flow of air which removes the heat generated by the electrical devices.

The size of the fans is limited by the height of the chassis. An electrical system that generates more heat than an existing design must be accompanied by more fans, or fans that create a higher flowrate. The flowrate is typically increased by raising the voltage level provided to the fan motors. Increasing the voltage level typically increases the noise emitted by the fans. Fan noise can be annoying to the end user of the computer. It would be desirable to provide a computer chassis that can adequately cool an electronic system which generates a relatively large amount of heat without emitting an undesirable level of noise.

SUMMARY OF THE INVENTION

The present invention is a computer chassis assembly that can adequately cool an electronic system which generates 450 watts of heat, without emitting cooling fan noise above 5 Bels of sound power. The assembly includes a chassis that has an outer wall and a first inner wall. The inner wall separates a first chassis compartment from a second chassis compartment. The chassis has a first pair of fans that create a negative pressure air flow which removes heat from a first electronic assembly within the first compartment. The chassis has a second fan that creates a positive pressure air flow which removes heat from a second electronic assembly within the second compartment. The first inner wall prevents the air flow of the second fan from flowing directly into the first fans and by-passing the electronic assemblies within the second compartment. The chassis also has a second inner wall separated from the first inner wall by a third compartment. A third fan creates a positive pressure air flow that removes heat from a third electronic assembly within the third compartment. The second and third compartments have air duct elements that guide the air flow directly onto the electronic assemblies to further increase the thermal efficiency of the chassis assembly. The speed of the first fan is controlled by a controller that is coupled to a temperature sensor which senses the ambient temperature surrounding the computer. If the ambient temperature increases, the fan speed is increased to lower the ambient temperature below a threshold level. The thermal efficiency of the chassis is such that the fans can operate between 6–12 volts so that the fans do not emit a noise level above 5 Bels of sound power.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
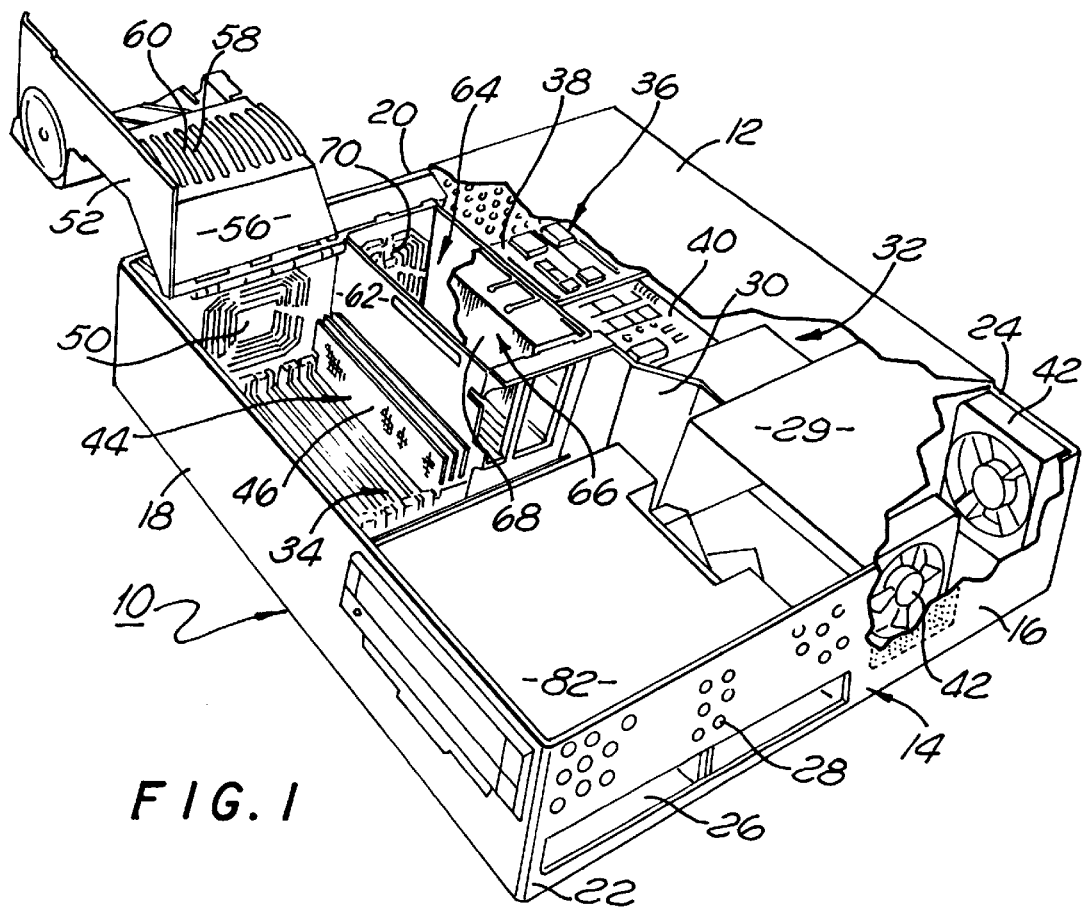
FIG. 1 is a perspective top view of a computer chassis of the present invention.

Referring to the drawings more particularly by reference numbers, FIG. 1 shows a computer housing 10 of the present invention. The housing 10 includes a cover 12 that is attached to a chassis 14. The housing 10 contains a plurality of electronic devices that each generate heat. The heat generated by the devices can be up to 450 watts. The computer of the present invention is thermally efficient enough to effectively cool a 450 watt system without running the computer fans at a speed that is excessively noisy. By way of example, a 450 watt computer can be cooled within operating temperatures without emitting noise above 5 Bels of sound power, all within a housing package of 450×450×125 millimeters (mm).

The chassis 14 includes an outer wall 16 that is typically stamped and bent into the configuration shown. The outer wall 16 is typically constructed from an individual front wall 18, a rear wall 24, a first side wall 22 and a second side wall 20. The walls have a number of slots 26 that allow various connectors and electronic cards to be attached and inserted into the chassis 14. The walls also have grill openings 28 that allow air to flow through the chassis 14.

The computer 10 contains a power supply 29 that is located adjacent to the rear 24 and first side 22 walls of the chassis 14. Extending from the power supply 29 to the second wall 24 is a first inner wall 30. The first inner wall 30 separates a first chassis compartment 32 from a second chassis compartment 34.

The first compartment 32 contains a first electronic assembly 36. The first electronic assembly 36 may include a plurality of electronic cards 38 that are plugged into a motherboard 40. The electronic cards 38 typically provide additional functions for the computer and are commonly referred to as "expansion cards". The power supply 29 has a pair of first fans 42 that induce a first flow of air through the first compartment 32. The first flow of air removes heat generated by the electronic cards 38 and the power supply 29. In the preferred embodiment, the housing contains two 92×25 mm first fans 42 that can remove 325 watts of heat generated by the cards 38 and the power supply 29. In the preferred embodiment, the first fans 42 create a negative pressure within the first compartment 32 so that the air flows from the ambient, into and across the compartment 32, and out of the chassis 16.

The second compartment 34 contains a second electronic assembly 44. The second electronic assembly 44 may include a plurality of single in-line memory modules (SIMMs) 46 that are plugged into the motherboard 40. The housing 10 has a second fan 50 that induces a second flow of air through the second compartment 34. In the preferred embodiment, the second fan 50 is a 92×25 mm unit that creates a positive pressure within the second compartment 34.

Figure 2:
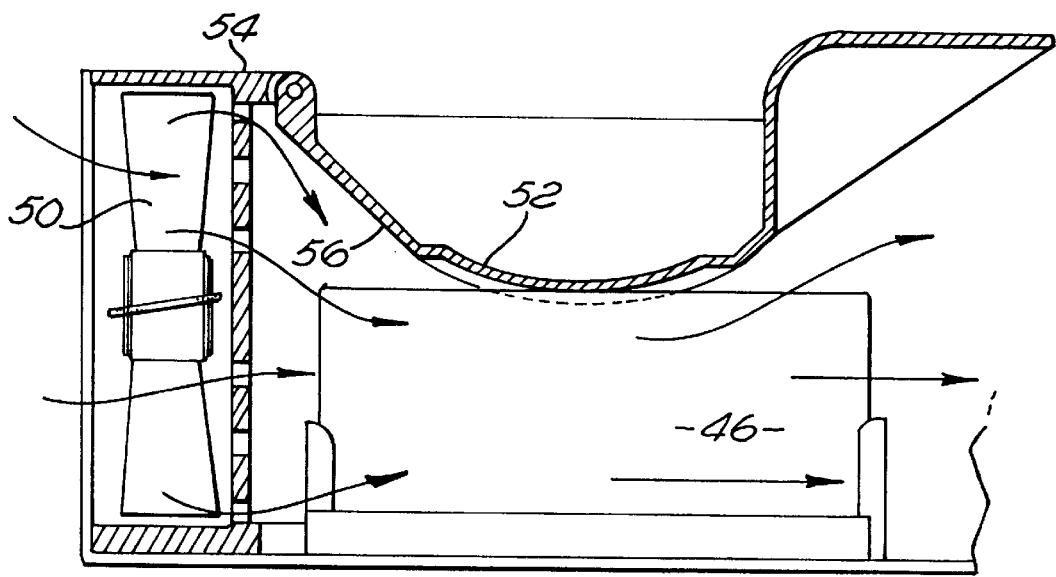
FIG. 2 is a side sectional view showing a cover of the chassis.

As shown in FIG. 2, the second compartment 34 is enclosed by a cover 52 that pivots about a fan wall 54 of the housing 10. The cover 52 has a tapered downwardly extending wall 56 that directs the air flow from the second fan 50 across the surfaces of the modules 46. The tapered wall 56 insures that the air flows across the electronic cards 46 and not above the cards. The direct air flow across the card surfaces increase the heat transfer rate from the cards to the air.

Referring to FIG. 1, the cover 52 may have a plurality of ridges 58 that are separated by a number of channels 60. The channels 60 receive the top edges of the modules 46 when the cover 52 encloses the second compartment 34. The ridges 58 constrain the modules 46 and prevent excessive card movement when the housing 10 is subjected to a shock or vibrational load. The cover 52 is preferably constructed to press the cards 46 into the motherboard 40 when the cover 52 is rotated to a closed position.

The first inner wall 30 is separated from a second inner wall 62 by a third compartment 64. The third compartment 64 contains a third electronic assembly 66. The third electronic assembly 66 may include electronic card assemblies 68 that are plugged into the motherboard 40. The cards 68 preferably contain microprocessors that operate the computer. The housing has a third fan 70 that induces a third flow of air across the third compartment 64. The third fan 70 and third compartment 64 provide a separate cooling system for the microprocessors which are highly sensitive to temperature variations. In the preferred embodiment, the third fan 70 is a 92×25 mm unit that creates a positive pressure within the third compartment 64. The first inner wall 30, second inner wall 62, cover 52 and fan wall 54 are preferably an integrally molded plastic subassembly that is attached to the chassis 14.

Figure 3:
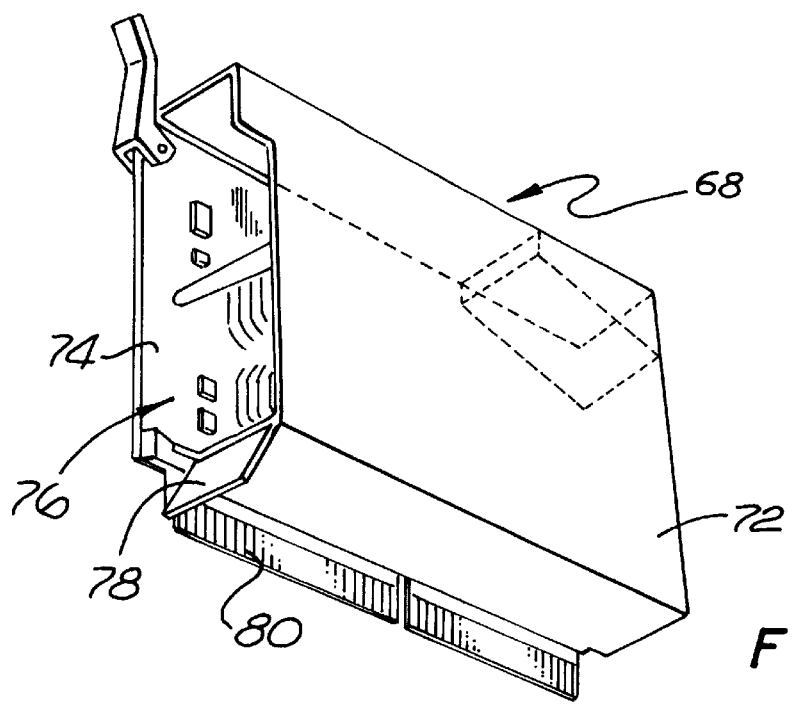
FIG. 3 is a perspective view showing a shroud attached to an electronic card.

As shown in FIG. 3, each electronic card assembly 68 includes a shroud 72 that is attached to an electronic card 74. The shroud 72 is separated from a surface of the card 74 to create an air duct 76. The air duct 76 directs the air flow generated by the third fan 70 across the surface of the card 74 to increase the heat transfer rate between the air and the electronic devices on the card 74. The shroud 72 also provides a handle that allows the end user to carry the electronic card 74 without touching the electronic devices mounted to the card 74. In the preferred embodiment, the shroud 72 has a lip 78 that prevents air from flowing along the connector edge 80 of the card 74. The lip 78 directs the air in the lower portion of the third compartment 64 into the air duct 76 to further increase the air flow and corresponding heat transfer rate across the card 74.

Referring to FIG. 1, the housing 12 may have a number of massive storage devices 82 such as hard disk drives, floppy disk drives and CD-ROM units. The storage devices 82 are cooled by the air flow generated by the second 50 and third 70 fans.

Figure 4:
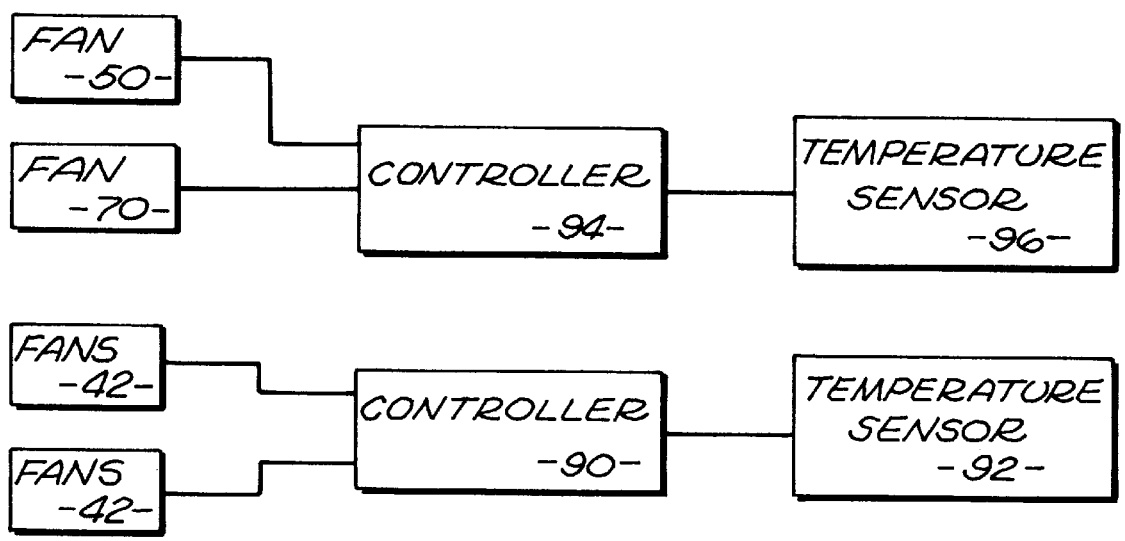
FIG. 4 is a schematic of a temperature control system for the fans of the computer.

Referring to FIG. 4, the computer 10 preferably has a control system for controlling the speed of the fans as a function of temperature. The first fans 42 are connected to a controller 90. The controller 90 is coupled to a temperature sensor 92 which senses the ambient temperature outside of the computer 10. The controller 90 increases the voltage and corresponding speed of the first fans 42 with an increase in ambient temperature. Likewise, the controller 90 decreases the fan speed when the ambient temperature decreases. The sensor 92 is preferably mounted to the chassis adjacent to the second compartment 34. The second compartment 34 generates a relatively low amount of heat that will not adversely effect the sensing of the ambient temperature.

Varying the speed of the fans 42 minimizes the noise emitted by the system. When the ambient temperature is relatively low, the fan speed is reduced to lower the noise while effectively cooling the computer. This system is to be distinguished from conventional prior art cooling systems which operate at a maximum fan speed for all ambient temperatures and thus emit a relatively high level of noise at all times. In the preferred embodiment, the first fans 42 and fan controller 90 are assembled in a power supply provided by Zitek Corp.

The second 50 and third 70 fans have a controller 94 that is coupled to a temperature sensor 96. The temperature sensor 96 is preferably attached to the microprocessor(s) of the electronic cards 74 in the third compartment 64. The controller 94 increases the voltage and corresponding speed of the fans when the temperature of the microprocessor increases, and decreases speed when the microprocessor temperature decreases.

The fans 42, 50 and 70 typically operate between 6 and 12 volts. The relatively low voltage levels minimize the noise emitted by the fans. The efficient cooling system of the chassis allow four fans to effectively cool a 450 watt computer, within a relatively dense packaging arrangement, and without creating fan noise above 5 Bels of sound power.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A computer housing, comprising:

a chassis which has an outer wall and a first inner wall which define a first compartment and a second compartment, said chassis further having a second inner wall that is separated from said first inner wall by a third compartment;

a first electronic assembly within said first compartment;

a second electronic assembly within said second compartment;

a third electronic assembly within said third compartment;

a power supply located within said first compartment and is electrically coupled to said first, second and third assemblies;

a pair of first fans that are within said first compartment and induce a first flow of air through said first compartment;

a second fan that is attached to said chassis and induces a second flow of air through said second compartment; and, a third fan that is attached to said chassis and induces a third flow of air through said third compartment.

2. The housing as recited in claim 1, wherein said first fan creates a pressure within said first compartment that is less than an ambient pressure.

3. The housing as recited in claim 2, wherein said second fan creates a pressure within said second compartment that is greater than an ambient pressure.

4. The housing as recited in claim 3, wherein said third fan creates a pressure within said third compartment that is greater than an ambient pressure.

5. The housing as recited in claim 1, further comprising an ambient temperature sensor that senses an ambient temperature and is coupled to a controller of said first fan, said controller varies a speed of said first fan in response to a change of the ambient temperature.

6. The housing as recited in claim 1, further comprising a temperature sensor that senses a temperature of said third electronic assembly and is coupled to a controller of said third fan, said controller varies a speed of said third fan in response to a change of the temperature.

7. The housing as recited in claim 1, wherein said second electronic assembly includes an electronic card, and said chassis includes a cover that encloses said second compartment and which has an outwardly tapered wall that extends toward said second electronic assembly so that the second air flow flows directly across said electronic card.

8. The housing as recited in claim 7, wherein said third electronic assembly includes a shroud that is attached to an electronic card, said shroud has an opening which directs the third air flow across said electronic card.

9. A computer housing, comprising:

a chassis which has an outer wall and a first inner wall which define a first compartment and a second compartment, said chassis further having a second inner wall that is separated from said first inner wall by a third compartment;

a first electronic assembly within the first compartment;

a second electronic assembly within the second compartment;

a third electronic assembly within the third compartment;

wherein said third electronic assembly includes a shroud that is attached to an electronic card;

a pair of first fans that are within said first compartment and induce a first flow of air through said first compartment;

a second fan that is attached to said chassis and induces a second flow of air through said second compartment; and, a third fan that is attached to said chassis and induces a third flow of air through said third compartment.

\* \* \* \* \*